US012730039B2

(12) United States Patent
Bhaskar

(10) Patent No.: US 12,730,039 B2
(45) Date of Patent: Sep. 8, 2026

(54) PORTABLE COMPOUND TRACE DETECTION DEVICE

(71) Applicant: Aditi Bhaskar, Wilsonville, OR (US)

(72) Inventor: Aditi Bhaskar, Wilsonville, OR (US)

(*) Notice: Subject to any disclaimer, the term of this patent is extended or adjusted under 35 U.S.C. 154(b) by 295 days.

(21) Appl. No.: 17/963,832

(22) Filed: Oct. 11, 2022

(65) Prior Publication Data

US 2024/0044758 A1 Feb. 8, 2024
US 2024/0295475 A9 Sep. 5, 2024

Related U.S. Application Data

(60) Provisional application No. 63/394,317, filed on Aug. 2, 2022.

(51) Int. Cl.

| | |
|---|---|
| ***G01N 1/40*** | (2006.01) |
| ***G01N 21/25*** | (2006.01) |
| ***G01N 21/31*** | (2006.01) |

(52) U.S. Cl.

CPC ............ *G01N 1/40* (2013.01); *G01N 21/255* (2013.01); *G01N 21/3103* (2013.01); *G01N 2001/4038* (2013.01)

(58) Field of Classification Search

CPC ............................ G01N 21/314; G01N 27/06
See application file for complete search history.

(56) References Cited

U.S. PATENT DOCUMENTS 3,901,786 A * 8/1975 Wheelwright ............ C25F 7/00 204/255
3,947,124 A * 3/1976 West .................... G01N 27/305 356/318

(Continued)

FOREIGN PATENT DOCUMENTS

WO WO-2008149247 A2 * 12/2008 ....... G01N 35/00663

OTHER PUBLICATIONS

Bogdanoff (1998. A New Inlet System for Differential Electrochemical Mass Spectroscopy Applied to the Photocorrosion of p-InP (111) Single Crystals. Journal of the Electrochemical Society, 145(2), p. 576) (Year: 1998).*

*Primary Examiner* — Michelle M Iacoletti
*Assistant Examiner* — Mohamed Doumbia
(74) *Attorney, Agent, or Firm* — Miller Nash LLP

(57) ABSTRACT

A detection device has a collector having an inlet to allow collection of a sample, an electrolysis chamber having at least two electrodes, the electrolysis chamber connected to the inlet to receive the sample, a spectrometry chamber connected to the electrolysis chamber by one or more channels, one or more emitters in the spectrometry chamber, one or more receivers in the spectrometry chamber, each receiver corresponding to an emitter of the one or more emitters, a controller to receive at least one signal from the one or more receivers and to provide a measurement, a display in communication with the controller to display the measurement, and a power supply electrically connected to at least the electrodes, the emitters, the receivers, the controller and the display. A method of detection of a compound in a sample includes drawing a sample into an electrolysis chamber, performing electrolysis on the sample, transferring the sample to a spectrometry chamber, illuminating the sample with light of a predetermined wavelength using an emitter, detecting light at a receiver corresponding to the emitter after the light passes through the sample, determining a concentration of a compound corresponding to the predetermined wavelength, and displaying the concentration of the one or more compounds on a display.

19 Claims, 7 Drawing Sheets

(56) References Cited

U.S. PATENT DOCUMENTS

| | | | | |
|---|---|---|---|---|
| 4,533,642 | A * | 8/1985 | Kelly | G01N 27/42 436/78 |
| 6,369,894 | B1 * | 4/2002 | Rasimas | G01N 21/645 356/417 |
| 9,222,890 | B2 * | 12/2015 | Kohara | G01N 21/67 |
| 2006/0185987 | A1 * | 8/2006 | May | C02F 1/46104 205/687 |
| 2011/0048964 | A1 * | 3/2011 | Luebke | C02F 1/4691 205/687 |
| 2016/0103089 | A1 * | 4/2016 | Boyette | G01N 27/08 356/72 |
| 2022/0234917 | A1 * | 7/2022 | Tseng | C02F 1/46109 |

* cited by examiner 14
12

16
10
12
30
18
28
24

32
20
22
26
16

66
50
50
53
40
60
54
62
52
57
42
56
58
66
70
68
68
34
32
58
58

PORTABLE COMPOUND TRACE DETECTION DEVICE

RELATED APPLICATIONS

This disclosure claims benefit of U.S. Provisional Patent Application No. 63/394,317, filed Aug. 2, 2022, which is incorporated herein in its entirety.

TECHNICAL FIELD

This disclosure relates to detection of trace compounds using both electrolysis and spectrometry in a portable device.

BACKGROUND

Nitrogen is an element abundantly found on earth. In many cases, methods for detecting nitrogen are not accessible or sufficient.

Nitrogen is an essential ingredient in promoting plant's growth and has been the main ingredient in fertilizers used in agriculture. However, runoff of excess DIN (Dissolved Inorganic Nitrogen, often from inorganic fertilizers, into water bodies causes algae blooms and becomes detrimental for sustaining marine life, which in turn affects other life forms and the Earth. Nitrogen in forms of nitrate ($NO_3^-$) and ammonium ($NH_4^-$) form the majority, over 90 percent, of DIN pollution.

Nitrogen is also an important element in both natural and synthetic fentanyl drugs. By measuring nitrogen content in alcohol or other beverages, a person may check if their beverage/drink has been contaminated.

Identifying nitrogen and its compounds in soil currently has high costs and large time investment. Many farmers, especially in developing countries, have neither the time nor resources to go through these processes. This results in over application of synthetic fertilizer, which has lower cost when compared to taking nitrogen measurements. Since most crops look the same whether with sufficient or surplus nutrients, farmers may repeatedly apply fertilizer even after a surplus exists to prevent deficiency of nutrients in the soil.

Hydroponic farming also needs a means to track nitrogen and other elements in the water in which the plants reside. Aquariums and other aqueous systems also have this need.

There are currently test strips for the occasional usages, and more chemistry-based detection processes for large farms, etc. Common chemistry-based nitrogen-compound detection methods include potentiometry, voltammetry, amperometry, and spectrometry. Although there are many detection methods, most are only capable of producing accurate or relevant results in lab settings. Even the most viable methods often have drawbacks, like interference with chlorine, or other natural compounds, when used in natural or organic settings.

DETAILED DESCRIPTION

Figures 1, 2:
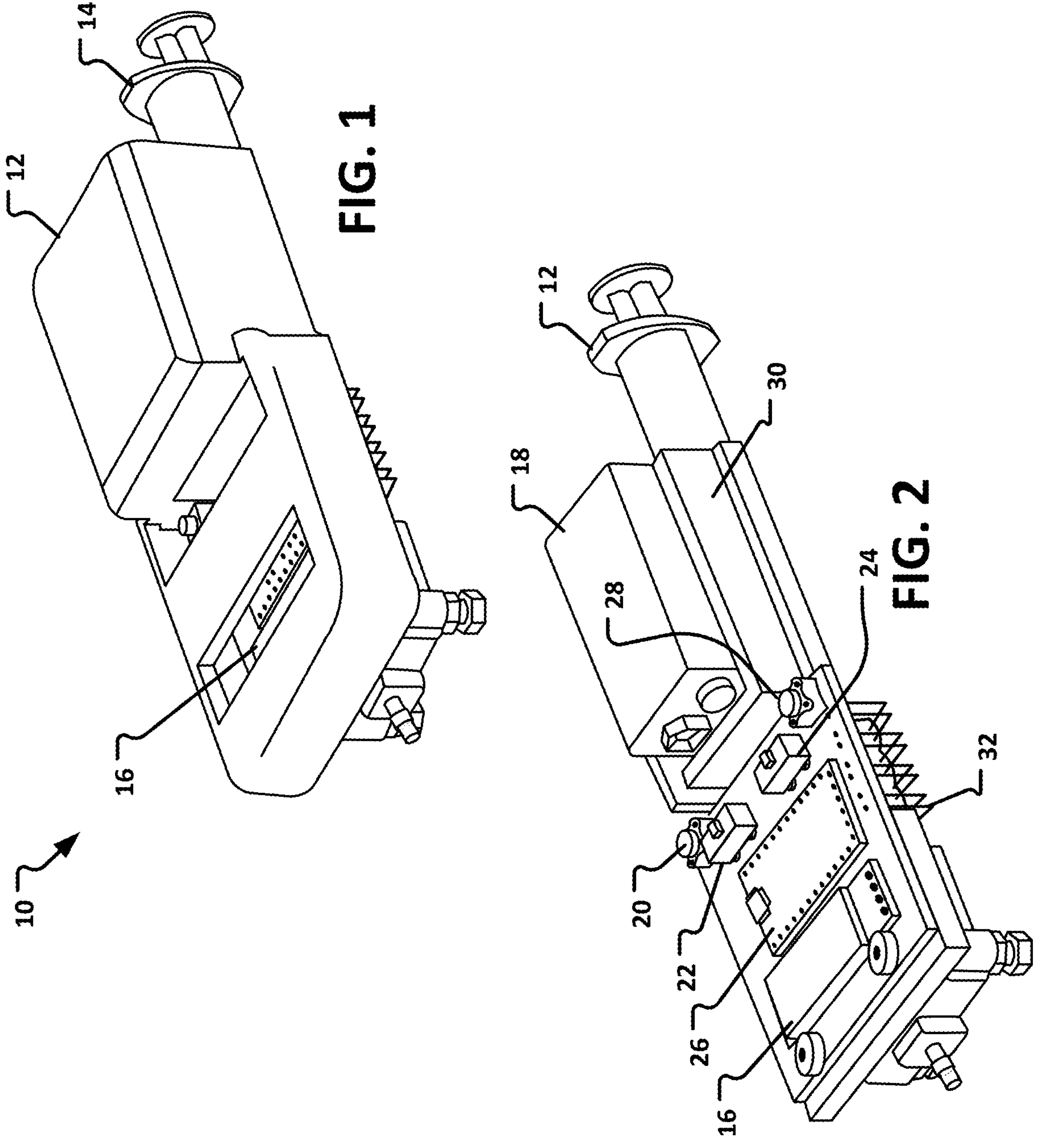
FIG. 1 shows a perspective view of handheld chemical detection device.
FIG. 2 shows a perspective view of the interior of first side of a portable chemical detection device.

The embodiments provide a novel methodology incorporated into a low cost, handheld, pocket size device. The device can measure nitrogen concentration of a sample within a few minutes using methodology of single cell copper electrolysis and spectrometry of specific copper-nitrogen compounds. The embodiments include a handheld device made from readily available, low cost materials. In addition, the device reports the results within a few minutes, and can be interpreted by users without technical training.

Currently, no published research exists on nitrogen detection methods that utilize both electrolysis and spectrometry in succession, as in the embodiments. This demonstrates the unique nature of the embodiments. The embodiments also account for interference from other compounds, such as sulfate, in the sample by using baseline wavelengths and taking a relative detection intensity rather than something absolute.

Providing this capability in a handheld device allows the users to have the results in their hands almost instantaneously. Most other current methods involve sending samples to labs and take days to process. Knowing the concentration of nitrogen in an environment allows the user to make fact-based decisions when applying dissolvable inorganic nitrogen to an area. This also reduces pollution in nearby aquatic environments and improves the ecosystem. The device reduces biofouling since the chemically processed samples are less than three milliliters in quantity, not harmful, and diluted.

Commercial and rural farmers would benefit from the deployment of the embodiments of a device for a nitrogen detection process, since commercial farmers often utilize time-taking lab-analysis methods and rural farmers spend excess money on wasted fertilizer. By using the methodology embodiments in place of other DIN detection systems, users have an inexpensive means to detect nitrogen levels. Using a portable device, including hand held devices, or an integrated system connected to the user via IOT (Internet of Things) provides results almost instantaneously to a wider audience, and for less cost than past detection systems. Users could use the embodiments here in any local or home gardening situations as well, such as for hydroponics, aquariums, golf courses, etc. Any avid home gardener will find interest in this DIY DIN detection system.

Another advantage of this method is its simplicity. Nitrogen, potassium, phosphorus, and sulfur may also be detected and measured using variations of the embodiments. Farmers, horticulturists, and aquarium managers can measure and manage multiple critical elements.

In addition, fentanyl contains nitrogen compounds as well. Fentanyl is often dropped into drink illicitly. The embodiments here could allow people, especially women who are often targeted, to detect fentanyl using a small sample and keep them safe when they drink unfamiliar or foreign concoctions, especially since fentanyl dissolves in alcohol. The FDA would find this device helpful when checking for fentanyl or other nitrogen-based drugs.

The embodiments of low cost device evaluates traces of the nitrogen concentration of a soil or liquid sample for the non-technical user. As mentioned above, the device is also handheld and reports data collected in readings almost instantaneously. The device also comprises using widely available materials, improving the accessibility of the device. Anyone with the materials could construct the device on their own, given instructions. This device can be easily manufactured without very specifically engineered materials, which many other chemical-based methods require.

The below discussion focuses on the embodiments in the form of a handheld, battery powered device. However, no limitation to that particular form factor is intended, nor should any be implied. The embodiments could also comprise a portable device powered by a battery or other direct current power source or an alternating current power source.

Similarly, the spectrometry applied here involves three wavelengths and two compounds for identification. The device could employ other wavelengths, in addition to or instead of those discussed here. This view shows a first side of the device, referred to here as the "top," with the understanding that the discussion could just as easily referred to it as the bottom.

FIG. 1 shows a perspective view of an embodiment of a handheld chemical trace detection device 10. The device has a housing, cap, or electrical enclosure 12 that encloses the device components, a collector 14 that allows a user to collect a sample, and a display 16 to display the result. In one embodiment, the collector 14 takes the form of a syringe with a plunger that allows the user to draw in the sample. As will be discussed below, the device may employ other means of sample collection.

FIG. 2 shows a perspective view of a first side of an embodiment of a handheld chemical trace detection device with the housing removed. The device has a power supply, in this embodiment in the form of a battery, and a battery holder 30. This may comprise a plastic such as ABS (acrylonitrile butadiene styrene), or PDMS (polydimethylsiloxane), possibly 3D printed. The electrical enclosure keeps the electronics safe from fluids in the fluid housing, discussed in more detail further.

The device may operate by many different types of selectors. The embodiments here use push buttons and slider switches but no limitation exist to those particular implementations. Push buttons 20 and 28 allow the user to pause, using one of the buttons, or cancel the processing sequences of the device. Similarly, two slider switches 22 and 24. One slider turns the overall device on, connecting the controller 26 to the power supply/battery 18. The other slider turns on and off the power to the electrodes in the electrolysis chamber, discussed in more detail later. The display 16 connects to the controller 26 and allows the user to see the results through an opening in the housing 12, as shown in FIG. 1. This view shows a small portion of the receivers, such as 32, but FIG. 3 shows these in better view.

Figure 3:
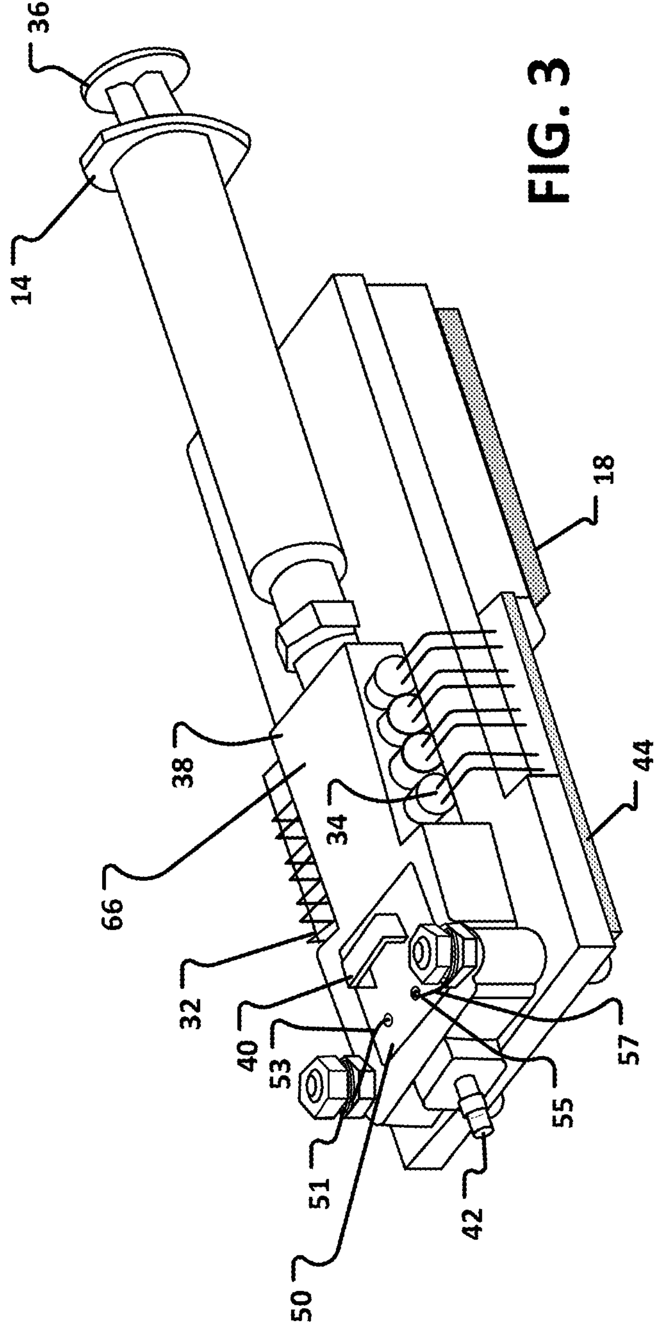
FIG. 3 shows a perspective view of a portable chemical detection device.

FIG. 3 shows the other side, or "bottom" of the device. The collector 14 and plunger 36, in this embodiment, draw the sample in through a collector port 42. This may comprise a piece of tubing, such as barb tubing, that connects to the inlet into the electrolysis chamber. As the fluid enters the device, it first undergoes electrolysis in an electrolysis subsystem 50. Electrolysis chemically decomposes the sample by passage of an electric current through the sample.

For the embodiments here, the sample undergoes single cell copper electrolysis. This makes all nitrates and ammonium compounds uniform, in the embodiments here, these compounds comprise either copper(II)nitrate or copper-ammonium-ion-complex by the end of the electrolysis. Copper comprises the excess reactant in the redox (reduction oxidation) reaction even for the most concentrated lab-grade samples of nitrogen compounds. The electrolysis allows for a detection of a single type of compound instead of detecting each compound separately.

Secondly, single cell copper electrolysis creates compounds of ammonium and nitrate in, or near the visible spectrum. Transmitters are easier to source, and at lower cost, when they are near the visible or IR ranges. Using different metals for the electrodes may have beneficial effects on the uniformity and visibility of other compounds.

The electrodes will more likely require replacement after each use. As such, the electrode insert 40 allows the user to remove and replace the electrodes and the filters, discussed in more detail later, for the electrolysis chamber between uses. The sample will exit the electrolysis subsystem 50 and moves into the spectrometry subsystem 66. The spectrometry subsystem 66 includes emitters 34, each emitter having a corresponding receiver 32. These communicate with the controller 26 shown in FIG. 2, through the printed circuit board (PCB) 44, powered by the battery 18. The fluid housing 38 keeps the fluids in the fluid path separate from the electrical subsystem.

Figure 4:
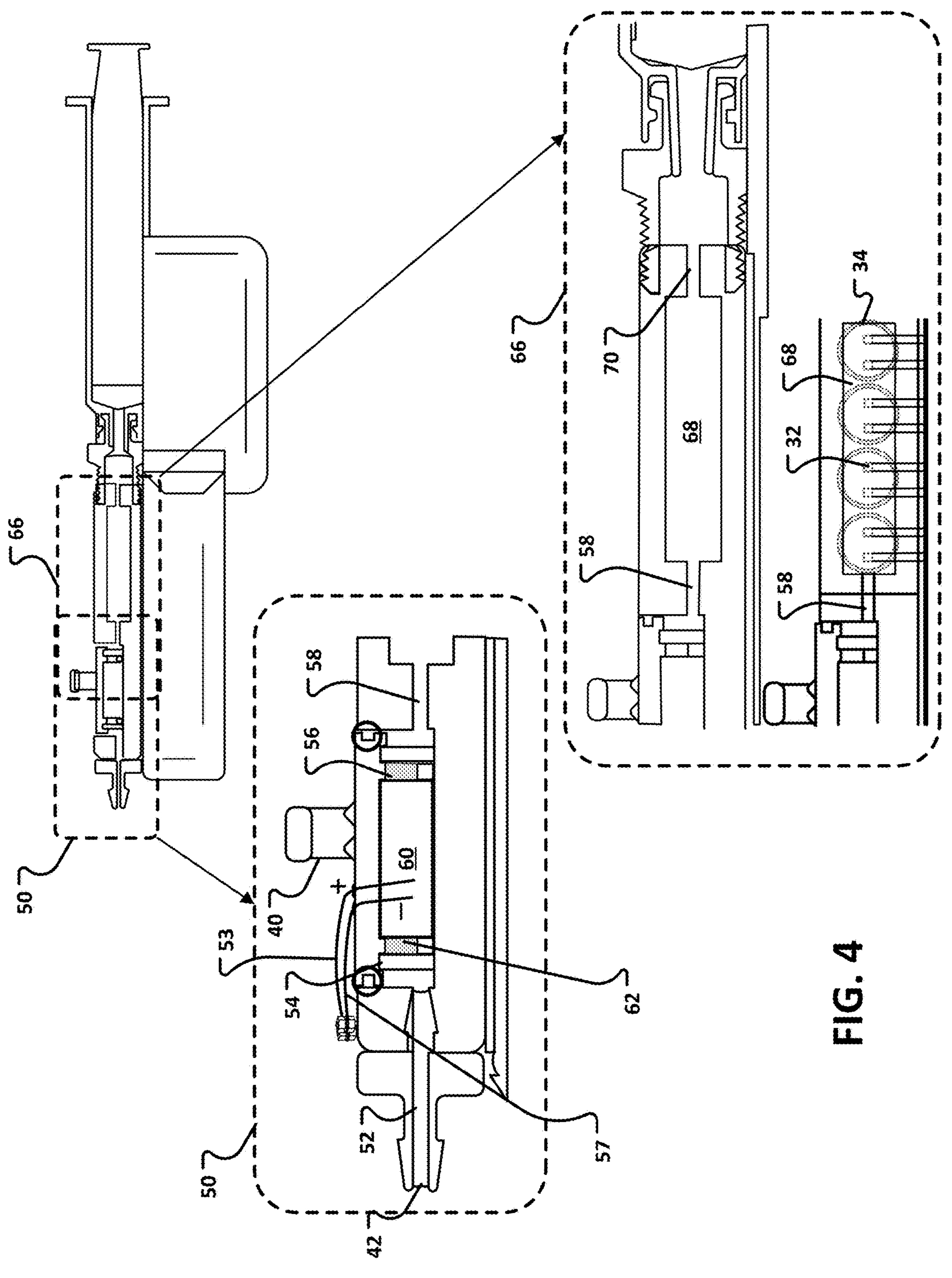
FIG. 4 shows a side view and exploded views of parts of an embodiment of a handheld chemical detection device.

The bolts 51 and 55 conduct electricity from the battery under control of the microcontroller through the electrode wires 53 and 57 respectively. The wires 53 and 57 act as the electrodes. The microcontroller will pass the electricity into the electrode wires that cause the electrolysis process to occur. FIG. 4 shows a side view of the device and exploded views of the electrolysis subsystem 50 and the spectrometry subsystem 66. The exploded view 50 of the electrolysis subsystem shows the collector port 42 and the inlet 52 through which the sample enters the electrolysis subsystem. The sample solution will mix by way of one or more specially designed, turbid, microfluidic channels. Mixing the sample increases the uniformity before filtration. An inlet filter 54 provides filtering of the sample. One issue that may arise is the management of colloids in the sample. Colloids generally comprise insoluble particles dispersed throughout the fluid of the sample. These may interfere with the flow of the fluid of the sample through the system and may have a detrimental effect on the accuracy of the readings. The inlet filter 54 addresses this issue.

The sample then enters the chamber 60 where it undergoes electrolysis. An outlet filter 56 then further filters the sample as it moves into the fluid channel 58. As mentioned above, the inlet filter, outlet filter and electrodes may connect to an electrode insert 40, easily removable and replaceable between samples. The fluid channel 58 may have ridges or other features that increase the mixing of the sample.

The spectrometry subsystem 66 connects to the fluid channel 58 that passes the sample into the spectrometry chamber 68. The view of FIG. 4 shows the chamber alone at the top of the exploded view, and then with the emitters such as 34 and receivers such as 32 one either side of the chamber 68. Using energy from the power supply, the emitters illuminate the electrolyzed sample and the receivers detect the light. The emitters may have a light guide, such as a narrow opening, lens, or window, to guide the illumination towards the receivers.

As will be discussed in more detail later, the detection of the light allows the device to determine the molarity of the compounds associated with the wavelengths of the detectors. In one embodiment, three emitters in the device emit different wavelengths of light, including 520 nm as a baseline, 615 nm for the copper-ammonium-ion complex, and 850 nm for copper(II) nitrate. The measurement is converted to "relative data" instead of "absolute data" to avoid colloidal interference. As discussed above, no limitation in the device to these particular compounds and other emitters may allow detection of other compounds. Similarly, the system may implement other forms of measurement including electromagnetic forces, a spinning chamber, or an electrostatic filter, as examples.

Prior to use, the device should undergo calibration, typically prior to shipment to users, to associate the molarity to the intensity. Calibration involves taking readings of multiple samples at multiple known molarities. Plotting the molarities of the calibration samples against their absorbance intensities should give a linear fit, and the constant value, one for each compound or wavelength, for the slope can be hardcoded into the molarity calculations.

Figure 5:
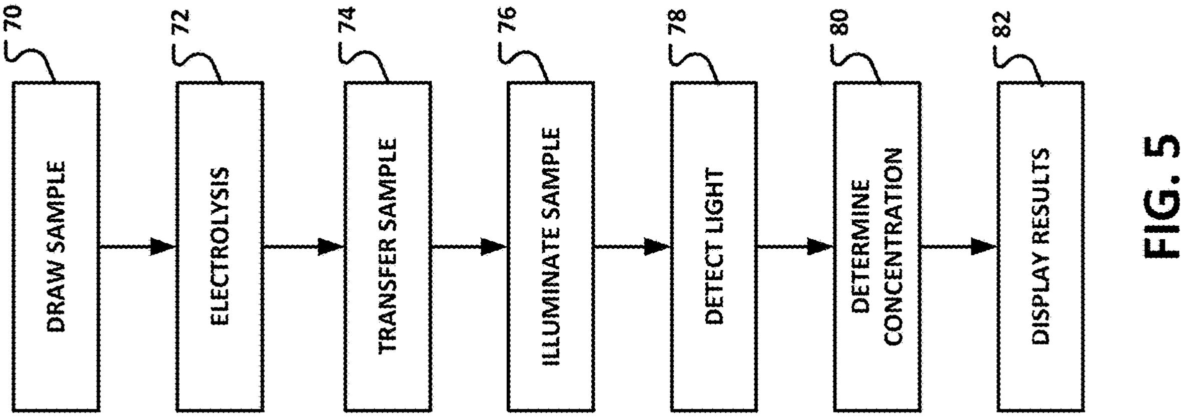
FIG. 5 shows an embodiment of a method of testing a sample for trace amounts of one or more chemicals.

FIG. 5 shows a flowchart of an overall embodiment of a method of using the device to test samples for trace chemicals. The process starts at 70 where the user or device draws the sample into the device. The drawing of the sample may include a user pulling the plunger on a syringe or automated approaches where the device draws the device in under power, rather than by a user. Some embodiments may include a pump to move the sample into the collection chamber.

The sample undergoes electrolysis at 72. The user then transfers the sample to the spectrometry chamber at 74. The emitters then illuminate the sample 76 and the receivers detect the received light at 78. The controller then uses the information on the detected light to determine the concentration of the targeted compounds at 80. The device then displays the results at 82.

The device outputs many parameters. These may include the molarity of nitrogen in each of its compounds in the sample. The device may also communicate the molarities of other compounds if detected. The device may also provide an output indicating whether the sample is deficient, sufficient, or surplus, as specific molarities of each compound are known to be in each of these ranges. The device could also provide suggestions or recommendations as to what the user could do to solve any problems due to excess concentrations. All data may be recorded by and stored on the controller, which may include a memory, or elsewhere for later referencing.

The below discussion provides an example of a more specific process for detecting traces of compounds. Processing the soil sample is very similar to making tea. First, a soil sample (1 g) should be taken and steeped in warm water (10 mL) at 30 to 50 degrees Celsius. The ratio of 1 g:10 mL is only the recommended ratio for mixing and dilution. Stir gently for 1 minute before straining into a beaker or other flask. This is the aqueous sample, used in the following instructions. Note that the process can also use liquid samples, such as from ground water or runoff. In either case, this discussion here refers to them generally as "sample(s)."

The device filters the sample before it enters the electrolysis chamber. By activating the electrolysis switch, the device then complete 5 minutes of single cell copper electrolysis. The outlet filter then filters the sample, and the channel mixes the sample before letting it exit the chamber.

As the sample is pulled into the electrolysis chamber, it may prove helpful if the user holds the device so that the sample is moving upward, the syringe/collector at the top, and the inlet at the bottom. After electrolysis, to prevent bubbles forming before the spectrometric detection, the user should turn the device 180 degrees so the sample is pulled downward, syringe at the bottom, inlet at the top. Controlling the flow rate of the sample can prevent bubbles and allows completion of the entire process in a timely fashion.

In the spectrometry chamber, an emitter and a receiver operate in pairs to read transmittance intensity at 520 nm (baseline), 615 nm (copper-ammonium-ion-complex), and 850 nm (copper(II)nitrate). According to the Beer-Lambert law, absorbance intensity is proportional to molarity, given a constant light path length and molar absorption coefficient. Since the latter two variables are constant, this equation can give us a mathematical model to convert the absorbance intensity at a given wavelength to the molarity of a compound in the sample.

In this device, the transmittance intensity is sampled, meaning the receiver measures the light from the emitter after passing through the sample. Absorbance intensity is the negative log of transmittance intensity, and so the transmittance intensity can convert to absorbance intensity.

Figure 6:
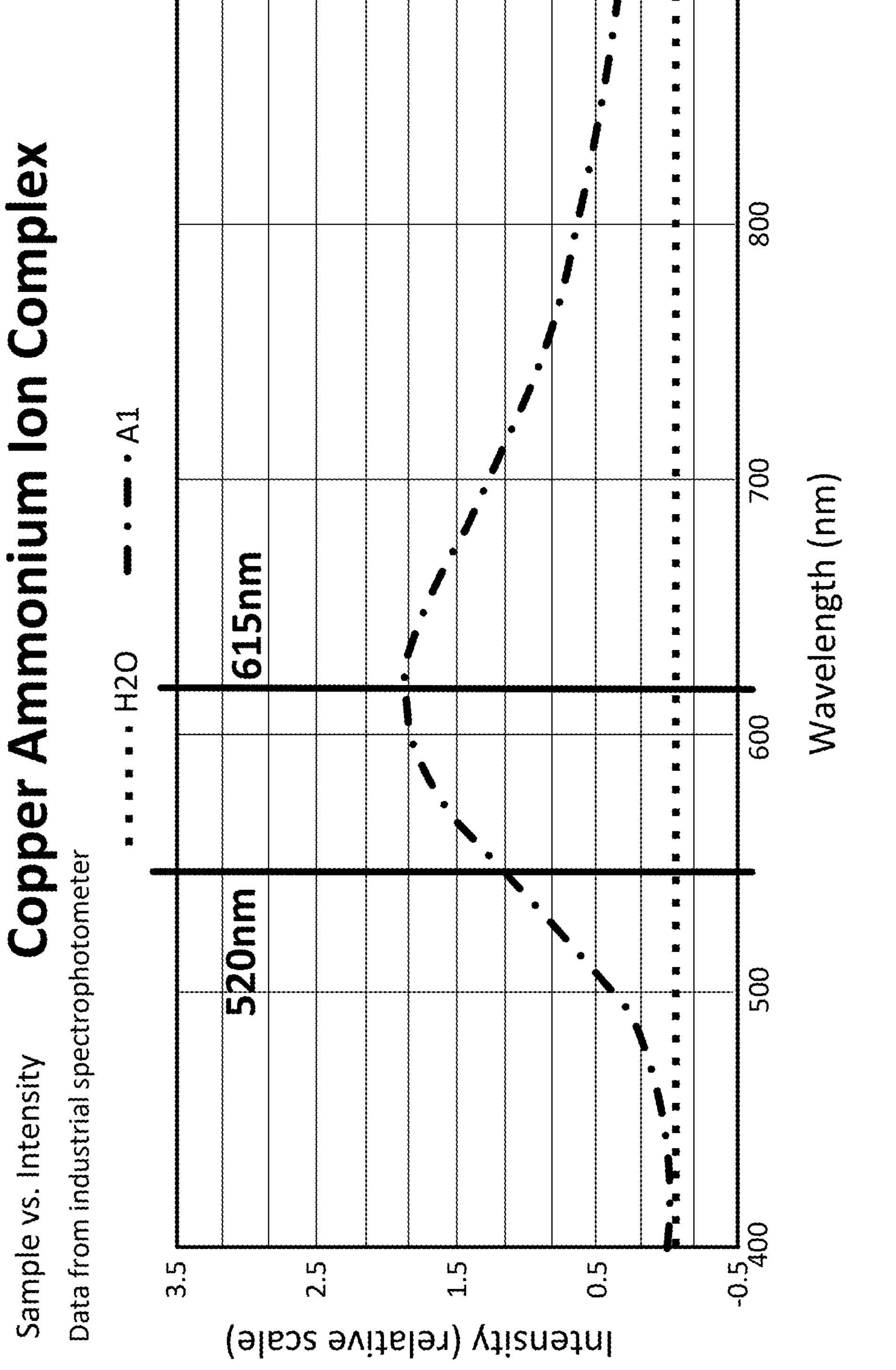
FIG. 6 shows an intensity versus wavelength graph for a copper electrolyzed 2.57 molarity ammonium-hydroxide sample.

FIG. 6 shows a graph of a turbid copper-electrolyzed 2.57 M ammonium-hydroxide sample. Note the 615 nm visible spectrum range line, representing emitters and receiver detection wavelength, lies at the peak of the absorbance spectrum. The 520 nm visible spectrum range emitters and receiver are around the "baseline" of the spectrum, so the offset can be used as a relative, as opposed to absolute, measurement of the sample.

Figure 7:
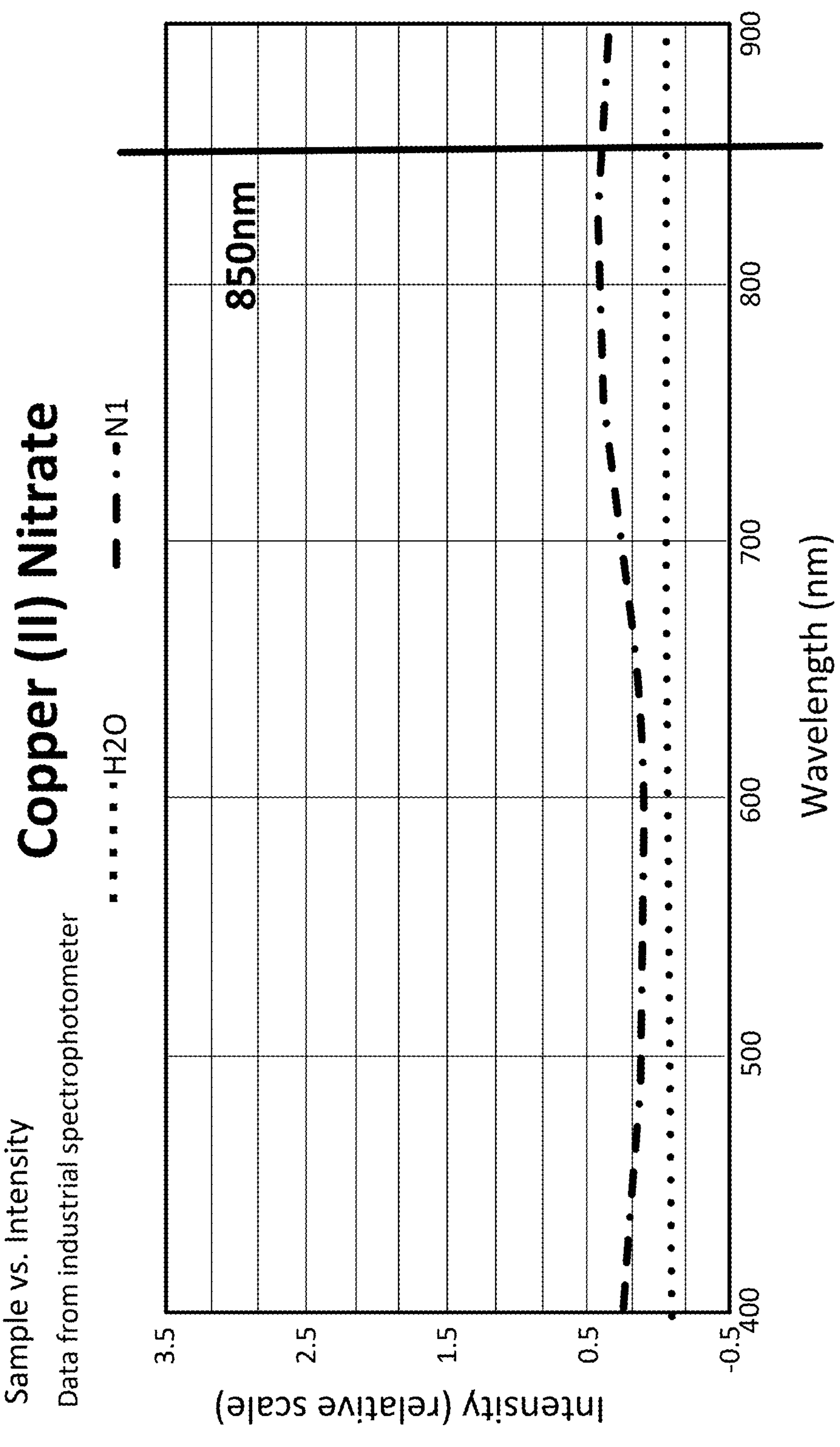
FIG. 7 shows an intensity versus wavelength graph for a copper electrolyzed 2.57 molarity magnesium-nitrate sample.

FIG. 7 shows a copper(II)nitrate graph, after copper-electrolysis of 1.0 M magnesium-nitrate, very similar to the one above, except the peak is at 850 nm, the IR spectrum range. The same 520 nm baseline is used for reference for nitrate detection as well.

The below equation provides an example of a calibration equation derived from the absorbance intensity values, after converting from transmittance intensity by taking the negative logarithm. The intensity is also measured on a relative scale, through voltage received after transmittance, from the receiver.

$$\text{Molarity} = \frac{\text{absorbance intensity} - B}{K}$$

$$\text{Absorbance intensity} = \log_{10}\left(\frac{1}{\text{Transmittance Intensity}}\right) = -\log_{10}(\text{Transmittance Intensity})$$

The following is a sample calculation, which includes a data table, its data points, and the molarity to absorbance intensity conversion equation. The following example is specific for the 850 nm emitter-receiver pair, for nitrate detection, as there would be a separate emitter-receiver pair for the 615 nm ammonium detection.

| Molarity (M) | 0.0600 | 0.1300 | 0.2500 |
|---|---|---|---|
| Transmittance Intensity | 145 | 116 | 90 |
| Absorbance Intensity | −2.1614 | −2.0645 | −1.9542 |

Figure 8:
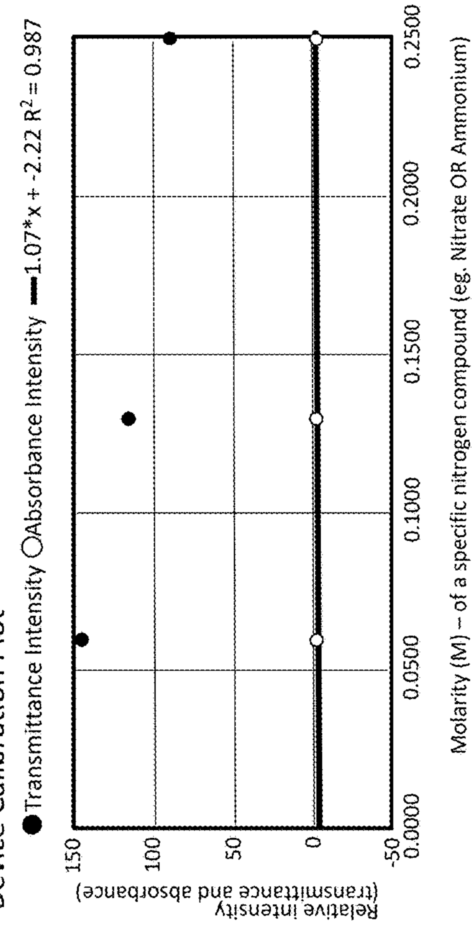
FIG. 8 shows an intensity versus molarity graph demonstrating the relationship between absorbance and molarity.
Figure 8:
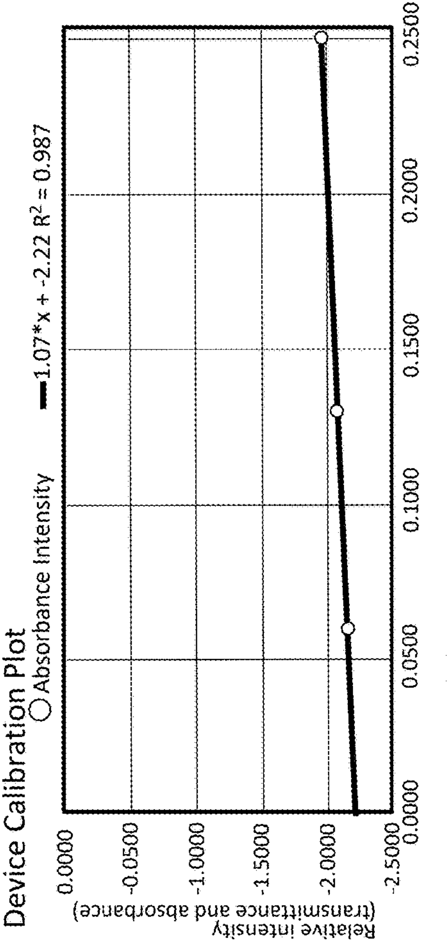

FIG. 8 shows a graph of this data, and shows a relationship with 99.7% correlation between absorbance and molarity. In equation form this is:

$$\text{Molarity} = \frac{\text{Absorbance Intensity} + 2.22}{1.07}$$

In this manner, an inexpensive, simple device and method can achieve detection of trace compounds. Many devices with similar goals of detecting nitrogen, phosphorous, and other compounds often utilize potentiometry or amperometery if they involve electrodes. The electrodes in these processes are often made of special carbon-copper compounds to reduce frequency of electrode replacement. The method of the embodiments sacrifices its electrodes in exchange for being more easily accessible, in contrast with the approaches that use the expensive carbon fiber electrodes.

Otherwise, if methods utilize spectrometry, they utilize spectrophotometry alone to optically evaluate the samples. Using these methods separately brings the cost of detection up because detection of wavelengths in the non-visible ranges (UV and IR) has much higher costs. The scarcity of supplies to carry out these readings makes these currently existing processes inaccessible where needed. By combining multiple concepts into one process, the aforementioned problems are solved.

Variations and modification exist. While the current embodiments address the use of electrolysis prior to spectrometry, other electrode-based concentration detection options could be used with spectrometry. These may include voltammetric or amperometric systems. While the electrical enclosure here is referred to as an electrolysis chamber, it may be employed in a voltammetric, amperometric or potentiometry system with little or no modification of the main components. These types of systems are considered to be within the scope of the claims and encompassed by the use of the term "electrolysis chamber." The device may also perform other measurements such as pH and temperature by inclusion of a pH meter and a thermometer.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A detection device, comprising:
- a collector having an inlet to allow collection of a sample solution;
- an electrolysis chamber having at least two electrodes positioned in the electrolysis chamber to contact the sample solution, the electrolysis chamber connected to the inlet to receive the sample solution and apply electrolysis to the sample solution to prepare the sample for spectrometry by separating the sample solution into one or more compounds and increase uniformity of the sample;
- a spectrometry chamber connected to the electrolysis chamber by one or more channels;
- one or more emitters in the spectrometry chamber;
- one or more receivers in the spectrometry chamber, each receiver corresponding to an emitter of the one or more emitters;
- a controller to activate the one or more emitters and receive at least one signal from the one or more receivers and to provide a measurement of the one or more compounds;
- a display in communication with the controller to display the measurement; and
- a power supply electrically connected to at least the electrodes, the emitters, the receivers, the controller and the display.

2. The device as claimed in claim 1, further comprising a housing that encloses components of the device.

3. The device as claimed in claim 1, further comprising one or more filters in the electrolysis chamber.

4. The device as claimed in claim 3, wherein the one or more filters comprise an inlet filter arranged at the inlet, and an outlet filter arranged between the electrolysis chamber and the spectrometry chamber.

5. The device as claimed in claim 4, wherein the one or more filters and the at least two electrodes are arranged on a removable insert.

6. The device as claimed in claim 1, further comprising a fluid housing arranged to enclose the electrolysis chamber and the spectrometry chamber.

7. The device as claimed in claim 1, further comprising an electrical housing to enclose the controller.

8. The device as claimed in claim 1, further comprising a printed circuit board upon which the controller is mounted and to which the emitters, receivers and power supplies are electrically connected.

9. The device as claimed in claim 1, further comprising a power selection switch to control power between the power supply and the controller.

10. The device as claimed in claim 1, further comprising an electrolysis switch to control power to the two or more electrodes in the electrolysis chamber.

11. The device as claimed in claim 1, wherein the collector comprises one of a syringe having a plunger configured that when the plunger is pulled, a sample enters the inlet, or a pump or motorized mechanism to pull the sample into the inlet.

12. The device as claimed in claim 1, wherein the one or more emitters has specific emission wavelengths to which the corresponding detector is sensitive.

13. The device as claimed in claim 12, wherein the one or more emitters includes at least one emitter that emits light having wavelength of 520 nm, 615 nm, or 850 nm.

14. The device as claimed in claim 1, wherein the controller comprises a microcontroller, a central processing unit, a field programmable gate array, or a digital signal processor.

15. The device as claimed in claim 1, wherein the controller further comprises at least one of an internal memory and access to a remote memory to which it can connect.

16. The device as claimed in claim 1, wherein the power supply comprises one of a direct current supply or an alternating current supply.

17. A method of detection of a compound in a sample, comprising:
- drawing a sample solution into an electrolysis chamber having at least two electrodes positioned to contact the sample solution;
- performing electrolysis on the sample to prepare the sample for spectrometry, and separate the sample into one or more compounds, and increase uniformity of the sample;
- transferring the sample to a spectrometry chamber;

illuminating the sample with light of a predetermined wavelength using an emitter;

detecting light at a receiver corresponding to the emitter after the light passes through the sample;

determining a concentration of a compound corresponding to the predetermined wavelength; and displaying the concentration of the one or more compounds on a display.

18. The method as claimed in claim 17, wherein determining the concentration of the one or more compounds comprises:

determining a transmittance intensity of light detected at the receiver;

using the transmittance intensity to find an absorbance intensity; and finding a molarity of the compound in the sample using the absorbance intensity.

19. The method as claimed in claim 17, wherein the illuminating, detecting, and determining are performed for multiple emitters, each having a predetermined wavelength corresponding to a different compound.

* * * * *